Figure 1:
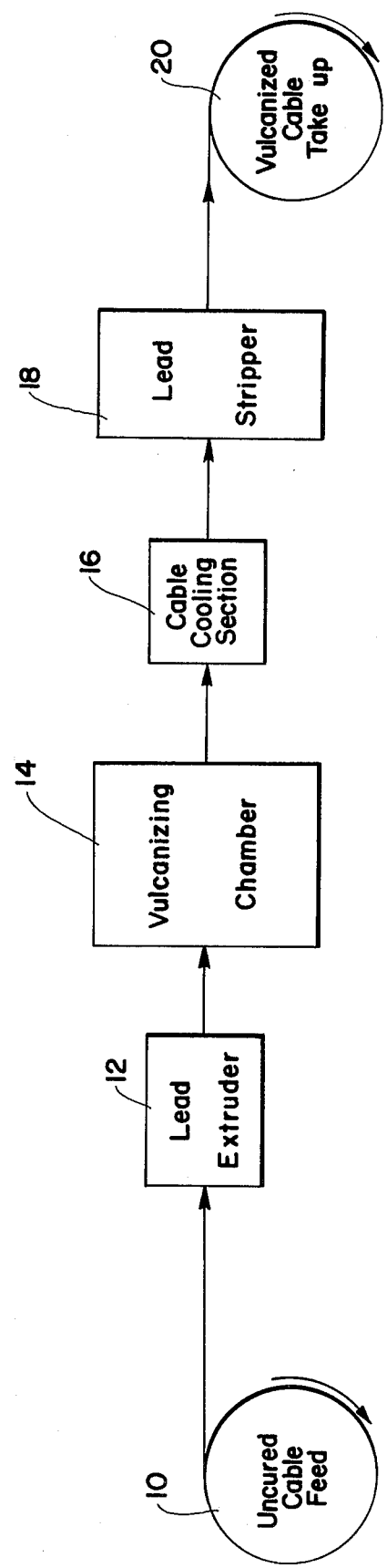

United States Patent [19]

Pochurek et al.

[11] 4,415,518
[45] Nov. 15, 1983

[54] CONTINUOUS CURING OF CABLE

[76] Inventors: Gerald M. Pochurek, 711 Jersey St., W. Deal, N.J. 07712; Ronald J. Keilly, 825 Martin Ave., Oradell, N.J. 07649

[21] Appl. No.: 332,538

[22] Filed: Dec. 21, 1981

[51] Int. Cl.³ .............................................. B29D 7/02
[52] U.S. Cl. ................................. 264/166; 264/178 R; 264/236; 264/347
[58] Field of Search .................... 264/166, 178 R, 236, 264/334, 347; 425/71, 445

[56] References Cited

U.S. PATENT DOCUMENTS

| | | | |
|---|---|---|---|
| 2,971,221 | 2/1961 | Schoenbeck | 264/347 |
| 3,051,992 | 9/1962 | Bradley | 264/178 R |
| 3,255,284 | 6/1966 | Meislohn | 264/236 |
| 3,284,259 | 11/1966 | Galloway et al. | 264/166 |
| 3,690,796 | 9/1972 | Borsvold | 264/166 |
| 3,883,384 | 5/1975 | Hopkins | 264/236 |
| 4,029,450 | 6/1977 | Caser | 264/347 |
| 4,112,031 | 9/1978 | Gohlisch | 264/236 |
| 4,226,823 | 10/1980 | Jansson et al. | 264/236 |

Primary Examiner—Donald E. Czaja
Assistant Examiner—W. Thompson

[57] ABSTRACT

Process for continuously curing an elastomeric jacket on a cable, comprising continuously passing a cable having an uncured elastomeric jacket thereon, encased within an outer temporary mold of heat conductive metallic material, e.g. metallic lead, of sufficient encasing layer thickness for protectively confining and supporting therewithin the elastomeric jacket and cable thereat, through a vulcanizing zone maintained at substantially atmospheric pressure and provided with a heat transfer bath, e.g. a fusible mixture including sodium nitrate, sodium nitrite, potassium nitrate and potassium nitrite, while applying the bath to the cable at a selective bath temperature, e.g. about 400°–500° F., sufficient for vulcanizing the mold encased elastomeric jacket in situ during passage of the cable through the zone whereby to vulcanize the jacket in situ substantially free from stress, damage or disturbance, and with subsequent cooling thereof prior to removal of the mold therefrom.

7 Claims, 1 Drawing Figure

CONTINUOUS CURING OF CABLE

The present invention relates to the continuous curing of an elastomeric jacket on a cable.

Cable of the type used for electrical transmission and distribution lines commonly has an elastomeric jacket which generally possesses excellent mechanical properties for protecting the cable from physical damage. This jacket is initially formed on the electrical transmission line usually by conventional extruding techniques and is then cured or vulcanized to enhance the long term stability of the jacket.

Mold curing of such a jacket is desirably utilized where it is sought to shape properly the jacket and control its density during its curing. For this purpose, a metallic lead mold is extruded onto the jacket and the jacket is mold cured in situ.

Conventionally, such mold curing has been accomplished through batch type processing. In such batch processing, the cable with the lead mold is wound on a reel and then the reel is placed in an autoclave or oven. In turn, the autoclave is heated to vulcanizing temperature and the reel is kept in the autoclave for a sufficient period of time for vulcanizing the elastomeric jacket within the lead mold. For example, in current day commercial installations, the autoclave is maintained at about 240°–275° F. for up to about five hours to achieve curing of the jacket.

It is well recognized in this regard that generally as the vulcanizing temperature is increased, the curing time for the elastomeric jacket is decreased. When steam is used as the heating medium, the temperature is related to the pressure such that as the pressure is increased, the corresponding curing time is decreased. In any case, after the curing period, the reel is removed from the autoclave and cooled. Upon removing the metallic lead mold, the cable, now provided with a vulcanized elastomeric jacket, is ready for use.

There are several distinct disadvantages in using the above described batch type processing for mold curing of the elastomeric jacket on the cable.

First, where steam, the usual heating medium, is used, correspondingly high operating pressures are required in order to obtain the desired high vulcanizing temperatures within the autoclave at commercially acceptable curing times. However, the use of such high pressures may result in unsafe and otherwise uneconomical operating conditions.

Second, the maximum cable length is directly dependent upon the process reel capacity and the maximum size of the reel is correspondingly dependent upon the size of the entrance to the autoclave itself.

Third, the lead mold must be constructed to provide the proper compression of the cable, or more specifically a constant annular volume for the elastomeric jacket, to prevent expansion of the elastomeric material and decrease in its desired density during the curing. The mold must also provide structural support of the cable layers or coils wound on the reel. In this regard, a running foot of conventional lead coated cable weighs about 40 pounds and without proper structural support the bottom layers or coils on the reel would be crushed.

In addition to batch processing of jacketed cable, there are also continuous vulcanizing systems available for curing elastomeric jacketed cables.

An example of such a system is the FSCV ® system manufactured by the Furukawa Electric Co., Ltd. of Ichihara Chiba 290 Japan. In this system an elastomeric jacketed cable without a mold is passed through a pressurized high temperature molten salt bath on a continuous basis to vulcanize the exposed elastomeric jacket. This system, however, does not use a mold to shape the jacket or control its density during curing, and instead relies on a sealed pressurized molten bath zone for carrying out the vulcanization.

As noted above, the use of high operating pressures may result in unsafe operating conditions, apart from the extra expense connected with the need for continuously maintaining the zone under pressure, whether high or low. Also, unless the span of running cable is adequately supported during its passage through any such pressurized molten bath zone, the integrity of the shape, volume and disposition of the exposed outer elastomeric jacket may suffer, since any such supporting and conveying means must necessarily come into direct contact with localized peripheral portions of the uncured jacket itself.

When a molten salt bath is employed, due to the need for elevated pressure, and the exposed nature of the uncured elastomeric jacket and required supporting and conveying means therefor, the cured jacket may suffer from the degradation of its properties and basic integrity, all at the expense of the necessary installation and maintenance costs for providing such elevated pressure and such supporting and conveying means.

It is among the objects and advantages of the present invention to overcome the foregoing drawbacks and deficiencies of the prior art, and to provide a process for mold cure continuous vulcanization of an elastomeric jacket on a cable, e.g. a power cable of the type used for electrical transmission and distribution lines, in a vulcanizing zone at substantially atmospheric pressure, using a heat transfer bath for supplying the desired vulcanizing temperature to the elastomeric jacket within its mold of selectively minimum thickness whereby to vulcanize the elastomeric jacket in situ substantially free from stress and in turn from damage to the integrity of and from disturbance of the disposition and volume of the elastomeric jacket.

It is among the additional objects and advantages of the present invention to provide a process of the foregoing type, which is comparatively efficient and inexpensive to carry out, utilizes a minimum of equipment which is readily provided and maintained while specifically avoiding the need for an autoclave and its concomitant dimensional and space limitations, and which permits relatively versatile selective variation in the line speed travel rate, cable size, vulcanization temperature and overall throughput of the operation without detracting from the obtaining of the desired controlled density and corresponding rugged physical properties in the resultant mold cured cable jacket.

Other and further objects and advantages of the present invention will become apparent from a study of the within specification and accompanying drawings, in which:

FIG. 1 is a schematic view of a system installation for carrying out the process of the present invention.

According to the present invention, a process for mold cure continuous vulcanization of an elastomeric jacket on a cable, e.g. a power cable of the type used for electrical transmission and distribution lines, is advantageously provided.

The process generally comprises continuously passing a cable having an uncured elastomeric jacket thereon, encased within an outer layer temporary mold of heat conductive metallic material of sufficient encasing layer thickness for protectively structurally confining and supporting therewithin the elastomeric jacket and cable thereat, through a vulcanizing zone maintained at substantially atmospheric pressure and provided with a heat transfer bath, while applying the bath to the cable at a selective bath temperature sufficient for vulcanizing the mold encased elastomeric jacket in situ during the passage of the cable through the jacket.

In this way, the elastomeric jacket may be vulcanized in situ substantially free from stress and in turn substantially free from damage to the integrity of and substantially free from disturbance of the disposition and volume, i.e. annular volume, of the elastomeric jacket. Thereafter, the resultant cable having the mold encased vulcanized, and selectively controlled density, elastomeric jacket thereon may be simply recovered from the zone.

Suitably, the recovered cable is then cooled and the mold is thereafter removed, e.g. stripped, therefrom. The mold may be desirably composed of metallic lead.

Preferably, the mold is applied, e.g. by extrusion, onto the uncured elastomeric jacket substantially immediately prior to passage of the cable through the zone. Hence, there is no need to store the mold containing cable intermediately on a reel prior to actual feeding of the same to the vulcanizing zone, and in turn no danger of any bottom layers or coils thereof becoming crushed.

The heat transfer bath may suitably comprise molten satl. This may be in the form of a fusible mixture or eutectic mixture of known inorganic salts such as a mixture comprising sodium nitrate, sodium nitrite, potassium nitrate and potassium nitrite.

The bath temperature may be any operative vulcanizing temperature for the elastomeric jacket, e.g. the bath may be maintained at a temperature of substantially between about 400°–500° F.

In accordance with an overall embodiment of the present invention, an uncured elastomeric jacketed cable, e.g. a cross-linkable polyethylene jacketed cable, is passed through a metallic lead extruder which applies a lead mold to the jacketed cable. The cable with the metallic lead mold thereon may then be conveniently immediately and directly passed continuously through the vulcanizing zone to cure the elastomeric jacket enclosed within the lead mold by contact with the heat transfer medium of the bath, e.g. molten salt.

In accordance with a preferred embodiment, the constituents of the bath are selected so that the cable with the metallic mold is totally protected as it is transported through the bath of the vulcanizing zone, e.g. from the immediately and directly up-stream mold extruder to an after cooling zone favorably immediately and directly downstream from the vulcanizing zone. The cable is encased as it passes between the cable entrance and the cable exit of the vulcanizing zone, thus eliminating the need at the zone for cable supporting apparatus of the usual involved and complex type when the cable is being vulcanized. The cable is then merely drawn from the bath and cooled, whereupon the metallic mold is stripped from the cable.

Referring to the drawing, a cable having an uncured outer protective elastomeric jacket around its main cable core is continuously transported in the direction shown from a feed reel 10 or the like to a metallic lead extruder or extruder section 12 wherein a metallic lead mold is continuously extruded onto the jacketed cable in conventional manner.

The cable core may contain the usual elements, e.g. to provide a power cable of the type used for electrical transmission and distribution lines, and the elastomeric jacket may be composed of any desired protective insulation material such as a cross-linkable polyethylene material, polymeric rubber material, or the like type uncured elastomeric material, in conventional manner.

In fact, the cable containing the uncured elastomeric jacket thereon may be provided in any well known manner as is true also of the ultimate preliminary mold containing form thereof which is to be vulcanized pursuant to the present invention.

Thus, alternatively, the cable core may be continuously fed from feed reel 10 to a first station for continuously applying, e.g. by extrusion, the uncured elastomeric jacket thereon and thence substantially immediately and directly in tandem thereafter be continuously fed to a second station for continuously applying, e.g. by separate extrusion, the metallic material forming the mold on the elastomeric jacketed cable, both such stations being comprised by extruder section 12.

Additionally, the cable core may be alternatively continuously fed to a combined tandem type composite section for continuously applying in sequence, e.g. by a first extrusion step at a first extrusion die set up, the uncured elastomeric jacket thereon, and substantially immediately and directly thereafter, e.g. by a second extrusion step at a second extrusion die set up downstream of the first die set up, the metallic material forming the mold on the elastomeric jacketed cable. Here also, both die set ups are contemplated at such extruder section 12.

In any case, the applying steps provide an ultimate preliminary composite cable or cable assembly emanating from extruder section 12, which is composed of a cable or cable core having an uncured elastomeric jacket thereon, encased within an outer layer temporary mold of heat conductive metallic material, such as metallic lead, of sufficient encasing thickness, e.g. of just minimumly sufficient encasing thickness, for protectively structurally confining and supporting therewithin the elastomeric jacket and cable or cable core.

The composite mold containing cable at this point, i.e. prior to vulcanizing, is therefore a conventionally obtainable assembly of the type subjected to conventional batch processing, but for the fact that it is not stored on a reel and placed in an autoclave or oven for static vulcanizing, and significantly also but for the additional fact that the layer thickness of the metallic mold is not as great as would otherwise be required to provide proper structural support for the bottom layers or coils on any storage reel to prevent crushing of such bottom layers or coils, i.e. under the full weight of the corresponding remaining upper lays or coils on the reel, as in the past in connection with such known autoclave or oven mold vulcanizing techniques.

As aforesaid, the thickness of the encasing metallic mold according to the present invention need only be sufficient for protectively structurally confining and supporting therewithin the elastomeric jacket and cable or cable core thereat, not the entirety or any remaining portion of the cable, i.e. which is not within the particular portion of the metallic mold thereat but within a remote layer or coil portion thereof and merely disposed in cumulative loading contact on a storage reel with that particular metallic mold portion.

The cable with the relatively thin metallic mold, e.g. of lead, thereon is then transported preferably substantially immediately and directly from the material extruder or extruder section 12 to the vulcanizing chamber of zone 14 in which the jacketed cable is cured in situ within the temporary metallic mold. The cable is then directed to a cooling section 16 wherein the jacketed cable with the mold thereon is cooled from the vulcanizing temperature, e.g. to ambient or room temperature, in conventional manner, e.g. using a gaseous cooling medium such as air or a liquid cooling medium such as water.

Thereafter, the resultant cooled cable passes to a conventional stripper 18 for stripping the lead mold from the cable, and finally to a take up reel 20 on which the fully vulcanized jacketed cable is wound ready for use.

It will be appreciated that since the nascently cured elastomeric jacket on the cable is protectively confined within the metallic mold, the particular cooling medium used in the cooling section 16 is advantageously not critical, because the cooling effect occurs indirectly through the heat conductive metallic mold material as heat transfer means and the cooling medium never comes into direct contact with the nascently cured elastomeric jacket.

Hence, the integrity of the elastomeric jacket is preserved, and particularly extraneous source moisture or gas generated microvoids or other surface or internal detrimental modification agency developments, i.e. traceable to direct contact between the still hot nascently cured elastomeric jacket and any such cooling medium, are completely voided according to the present invention.

Moreover, because of the relatively thinner thickness of the encasing layer metallic mold, correspondingly less expansion of the mold occurs at the elevated vulcanizing temperature in the vulcanizing zone 14, and concomitantly less contraction of the mold occurs in reducing the temperature of the mold and cured elastomeric jacket in the cooling section 16 to the cooling temperature selected, e.g. ambient or room temperature.

Significantly, therefore, according to the present invention the uncured elastomeric jacket is not able to expand radially outwardly and/or increasingly circumferentially so as to increase significantly its annular cross sectional dimensions and extent during curing, as in the past where a much thicker metallic mold was used in the known autoclave or oven batch processing technique. In turn, the nascently cured elastomeric jacket is concomitantly not contracted radially inwardly and/or decreasingly circumferentially by the simultaneously contracting mold so as to radially inwardly compress and compact the nascently cured elastomeric jacket significantly upon its return to its original annular cross sectional dimensions and extent during cooling.

This avoids concomitant disturbance of the integrity and desired control of the density of the elastomeric jacket.

Insofar as presently understood, in this regard, it is believed that as the mass and annular or radial thickness of the metallic mold increases, the same will concomitantly increase its composite circumference and radial thickness with heat expansion per degree rise in temperature, thereby increasing its resultant tubular size until again contracted with cooling to its original tubular size.

Stated another way, the larger the volume of the metallic material in a given thickness of the mold, the larger will be its expansion per degree rise in temperature. This is because for volume expansion of an isotropic substance or medium like lead or other metallic material, linear expansion takes place equally in all directions, i.e. lengthwise axially along the cable, widthwise circumferentially outwardly about the cable, and thicknesswise radially upwardly or outwardly of the cable axis, or three times the product of the linear coefficient of thermal expansion of the particular metallic material and the original volume per degree rise in temperature.

Thus, as the starting volume increases incrementally the degree of expansion increases incrementally threefold thereof, as illustrated in the following well-known equasion for volume expansion of isotropic media:

$$v = 3aV(t_2 - t_1)$$

where $v$ is the increase in volume, $a$ is the linear coefficient of expansion of the particular isotropic medium, e.g. metallic lead, $V$ is the original volume of the solid mass, and $t_2 - t_1$ is the rise in temperature from the original temperature $t_1$ to the final temperature $t_2$ to which the solid mass is raised.

The provision of a continuous process utilizing a metallic mold in which a cable is vulcanized, i.e. in a salt bath at atmospheric pressure, is in and of itself unique and highly advantageous.

In addition, by providing a metallic mold of reduced tubular thickness in accordance with the present invention, several specific additional advantages are achieved.

First, compared to the known autoclave or oven batch processing technique, less metallic material per unit length of cable is required, and in turn a saving in such material, and in connection with attendant manipulations corresponding savings regarding its preparation for and dispensing onto the cable during the applying, e.g. extrusion, step, its removal, e.g. stripping, from the cable after the curing step and its recovery for recycling and reuse.

Second, a more efficient heat transfer is possible than otherwise due to the shorter or thinner annular or radial path through which the heat must pass, i.e. inwardly during the vulcanizing step and outwardly during the cooling step, without detriment to the structural protection of the uncured elastomeric jacket from physical or mechanical stress, distortion, damage, etc., e.g. during transport of the cable from the material extruder or extruder section 12 through the vulcanizing zone 14 to the cooling section 14, or from chemical or processing distortion, damage, etc., e.g. due to the direct contact with extraneous source agencies during the vulcanizing and/or cooling steps.

Third, the overall weight per unit length of the cable is concomitantly decreased, thereby reducing the efforts involved in transporting the cable from the material extruder or extruder section 12 to the stripper 18, yet the confined uncured elastomeric jacket retains its desired selective annular or radial dimension despite the high temperature variations to which the mold is subjected during the vulcanizing and cooling steps, and provides a favorably constant product of substantially uniform cured jacket dimension and integrity, and in turn of uniform desired density and ruggedness.

Fourth, since the uncured elastomeric jacket is protectively encased in the metallic mold, the vulcanizing may be carried out at atmospheric pressure, i.e. without the need to provide and maintain elevated pressure in the vulcanizing zone 14 or constructional measures to accommodate any such elevated pressure in the vulcanizing zone. Hence, elevated pressures otherwise directly exerted against the exposed uncured elastomeric jacket at elevated temperatures, as in the past in connection with known continuous processes in which the elastomeric jacketed cable, without any protective mold, was passed through a sealed pressurized high temperature molten salt bath zone, are avoided along with their inherent modifying effect on the disposition and integrity, including the resultant density and ruggedness, of the elastomeric jacket during curing. In accordance with a preferred embodiment of the present invention, the vulcanizing zone 14 is maintained at substantially about atmospheric pressure and includes a heat transfer bath, such as a molten bath comprising a fusible or eutectic mixture of sodium nitrate, sodium nitrite, potassium nitrate and potassium nitrite, which is stable at the vulcanizing temperature used, e.g. between about 400°–500° C. (i.e. about 204°–260° C.). The heat transfer bath is heated conductively in any appropriate manner, e.g. by electrical resistance heating means, to the appropriate vulcanizing temperature and maintained at such temperature. With a heat transfer bath of this composition, it is unnecessary to utilize high pressure to achieve the desired vulcanizing temperature of 400°–500° F. as aforesaid, as was the case with conventional steam heated autoclaves or other vulcanizing chambers in the past.

With the metallic mold in use, the need of cable supporting apparatus in the vulcanizing zone during the vulcanizing process is obviated. The jacketed cable may be passed along the bottom of the bath without damage while still obtaining the desired vulcanization effect. Alternatively the jacketed cable may be elevated at the surface or be buoyantly supported in the bath for the duration of the vulcanizing of the elastomeric jacket as determined by the running speed at which the cable is being transported through the bath at the vulcanizing temperature selected.

Understandably, any material may be used as the heat transfer medium which is fusible or molten at the desired elevated vulcanizing temperature selected, and substantially inert to the mold and substantially non-volatile at ambient pressure, i.e. at the elevated vulcanizing temperature selected.

In effect, therefore, the vulcanizing bath is applied to the cable at a selective bath temperature sufficient for vulcanizing the mold encased elastomeric jacket in situ during passage of the cable through the vulcanizing zone 14, whether it passes along the bottom or is buoyantly supported in the bath. In this way, the elastomeric jacket is vulcanized in situ substantially free from stress, e.g. mechanical stress from cable transporting and suspending means, and in turn free from damage to the integrity i.e. material uniformity without mirovoids and other disturbances therein, of the elastomeric jacket, as well as free from disturbances of the disposition and volume, i.e. annular thickness and uniformity, including density uniformity, of the elastomeric jacket.

It will be realized, in review, that the general purpose of conventional lead mold cure vulcanization is to obtain rugged physical properties for the elastomeric jacket, but that this occurs at the expense of having to use elevated temperatures and elevated pressures in a steam heated autoclave batch type process in which the size of the entrance to the autoclave itself restricts the processed cable length to the capacity of a reel that can fit into the autoclave, as earlier noted.

One such batch process, for example, requires a vulcanizing temperature of 240° F. and about 5 hours vulcanizing time, and while the cure time can be reduced, this requires more vigorous and dangerous process conditions involving significantly increased temperature and steam pressure, which may not always be possible to utilize, as the artisan will appreciate.

This is especially true, quite apart from apparatus limitations, where the heat sensitivity of the surface compound in the elastomeric jacket to be cured and that of any cable core compounds which may be present are such that increased temperatures would be detrimental to the result desired, thus relegating such instances to use of lower vulcanizing temperatures and extended batch times.

Hence, the conventional lead mold in essence serves two basic functions in the batch process. First, it provides compression of the outer compound coating or jacket during vulcanization to achieve an increase in compound density or ruggedness factor, as compared to the vulcanization of such jacket without any lead mold. Second, it provides structural support of the bottom and intermediate layers of the uncured jacket containing cable wound on the processing reel, as aforesaid.

More particularly, in this regard, a foot of lead coated cable may weigh for example 40 pounds, e.g. a cable having a 3.5 inch diameter including the elastomeric jacket and a 0.190 inch thick lead mold encasing the elastomeric jacket for protecting the bottom layers of the cable on the reel from being crushed.

In contrast thereto, in accordance with the present invention, the same 3.5 inch cable may be provided with a lead or other metallic material mold for retaining the advantage of compression or ruggedness, but reduced in mold layer thickness by about 50%, because of the elimination of the need for extra structural support as would be required in storing the cable on a batch processing reel in favor of a continuous process.

Hence, according to the present invention, a metallic material mold having a thickness of only about 0.085 inch may be provided on such a 3.5 inch diameter cable, since the mold containing cable may be passed continuously more or less immediately and directly from the material extruder section 12 to and through the vulcanizing zone 14 to the cooling section 16, for the continuous vulcanizing of the cable via the molten bath, i.e. maintained at atmospheric pressure and at a selective vulcanizing temperature sufficient for curing the elastomeric or rubber compound material in the cable jacket in dependence upon the length of the bath and the running speed of the cable therethrough.

The foregoing advantages are most effectively achieved because the stream used of heating purposes in the prior art batch process is substituted by the superior molten bath heating medium used herein, and because of the reduction in the thickness of the metallic metal mold.

In review, therefore, by utilizing the process of the present invention, the amount of lead or other metallic material, compared with that conventionally required in a mold batch process for proper cure and support of the cable during the operation, is reduced by at least approximately 50%. Furthermore, as aforesaid, the need of high pressure normally required during conventional curing utilizing steam heat is eliminated. Since the process according to the present invention is continuous, it is now possible using the metallic mold technique to manufacture cables in continuous lengths far exceeding those conventionally manufactured using finite reel accommodating lengths in a batch type process.

Moreover, unlike prior art continuous mold-free cable vulcanization processes using molten baths, the present process avoids the need for elevated pressure, and eliminates any direct contact between the uncured elastomeric jacket and any transporting or conveying means or even the bath itself as well as any expansion of the elastomeric jacket radially outwardly beyond its original confines, since it is retained within the metallic material mold for achieving in controlled manner the desired increased compound density and ruggedness factor without regard to system pressure.

It will be realized that the foregoing specification and accompanying drawing are set forth by way of illustration and not limitation of the present invention, and that various modifications and changes may be made therein without departing from the spirit and scope of the present invention which is to be limited solely by the scope of the appended claims.

What is claimed is:

1. Process for continuously curing an elastomeric jacket on a cable comprising continuously linearly passing a cable having an uncured elastomeric jacket thereon, encased within an outer layer temporary mold of heat conductive metallic material of substantially minimumly sufficient encasing layer thickness for protectively structurally confining and supporting therewithin the elastomeric jacket and cable thereat, through a vulcanizing zone maintained at substantially atmospheric pressure and provided with a heat transfer bath, applying the bath to the cable at a selective bath temperature sufficient for vulcanizing the mold encased elastomeric jacket in situ during passage of the cable through the zone whereby to vulcanize the elastomeric jacket in situ substantially free from stress and in turn from damage to the integrity of and from disturbance of the disposition and volume of the elastomeric jacket, and recovering from the zone the resultant cable having the mold encased vulcanized elastomeric jacket thereon.

2. Process according to claim 1 wherein the recovered cable is cooled and the mold is thereafter removed therefrom.

3. Process according to claim 1 wherein the mold is composed of metallic lead.

4. Process according to claim 1 wherein the mold is applied onto the uncured elastomeric jacket substantially immediately prior to passage of the cable through the zone.

5. Process according to claim 1 wherein the bath comprises molten salt.

6. Process according to claim 1 wherein the bath comprises a fusible mixture of sodium nitrate, sodium nitrite, potassium nitrate and potassium nitrite.

7. Process according to claim 1 wherein the bath is maintined at substantially between about 400°–500° F.

* * * * *